United States Patent
Weder

(10) Patent No.: US 8,033,051 B2
(45) Date of Patent: Oct. 11, 2011

(54) WRAPPER WITH DECORATIVE EXTENSION AND METHOD

(75) Inventor: Donald E. Weder, Highland, IL (US)

(73) Assignees: Wanda M. Weder, Highland, IL (US); William F. Straeter, Highland, IL (US), not individually, but solely as Trustees of The Family Trust U/T/A dated Dec. 8, 1995.

(*) Notice: Subject to any disclaimer, the term of this patent is extended or adjusted under 35 U.S.C. 154(b) by 0 days.

(21) Appl. No.: 12/898,202

(22) Filed: Oct. 5, 2010

(65) Prior Publication Data

US 2011/0016827 A1    Jan. 27, 2011

Related U.S. Application Data

(63) Continuation of application No. 12/787,536, filed on May 26, 2010, now abandoned, which is a continuation of application No. 12/231,092, filed on Aug. 29, 2008, now abandoned, which is a continuation of application No. 11/120,383, filed on May 2, 2005, now abandoned, which is a continuation of application No. 10/446,497, filed on May 27, 2003, now abandoned, which is a continuation-in-part of application No. 10/350,956, filed on Jan. 23, 2003, now abandoned, which is a continuation-in-part of application No. 10/135,334, filed on Apr. 25, 2002, now abandoned.

(51) Int. Cl.
*A01G 9/02*    (2006.01)

(52) U.S. Cl. ............................................. 47/72
(58) Field of Classification Search .................. 47/72
See application file for complete search history.

(56) References Cited

U.S. PATENT DOCUMENTS

| | | | |
|---|---|---|---|
| 1,446,563 A | 2/1923 | Hughes | |
| 1,610,652 A | 12/1926 | Bouchard | |
| 1,697,751 A | 1/1929 | Blake | |
| 3,572,499 A | 3/1971 | Mondano | |
| 4,216,620 A | 8/1980 | Weder et al. | |
| 5,943,819 A * | 8/1999 | Weder et al. | 47/41.01 |
| 5,987,849 A | 11/1999 | Weder | |
| 5,991,999 A | 11/1999 | Weder | |
| 2005/0241228 A1 | 11/2005 | Weder | |
| 2009/0031673 A1 | 2/2009 | Weder | |
| 2009/0038217 A1 | 2/2009 | Weder | |
| 2009/0038266 A1 | 2/2009 | Weder | |

FOREIGN PATENT DOCUMENTS

WO    WO 94/24971    11/1994

* cited by examiner

Primary Examiner — Frank T Palo
(74) Attorney, Agent, or Firm — Dunlap Codding, P.C.

(57) ABSTRACT

A wrapper for wrapping a flower pot and/or floral grouping is disclosed. The wrapper is constructed of a sheet of material having an extension attached to a portion of the sheet of material. When the wrapper is formed about a flower pot to form a decorative cover, upper edges of the sheet of material and extension cooperate to form a skirt portion preferably having at least two separate edges providing a "two-sheet" effect in the decorative cover. The wrapper may have extensions on opposing ends of the sheet of material and may have one or more additional overlapping extensions.

12 Claims, 14 Drawing Sheets

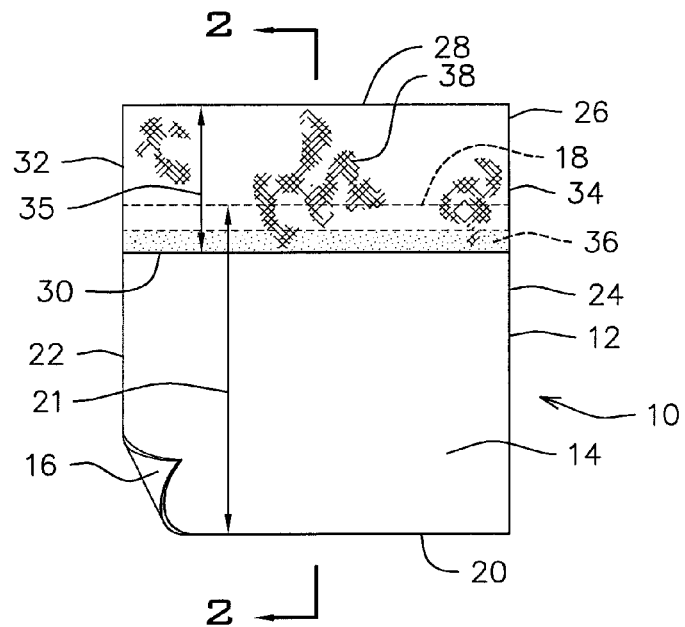
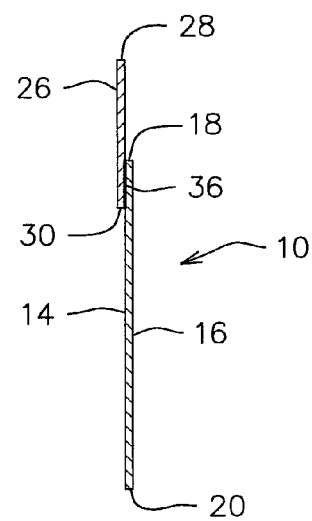
FIG. 1
FIG. 2
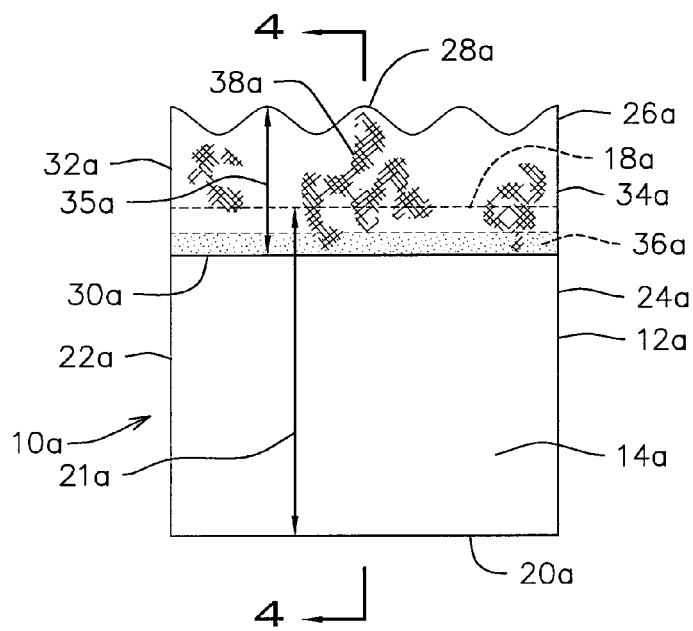
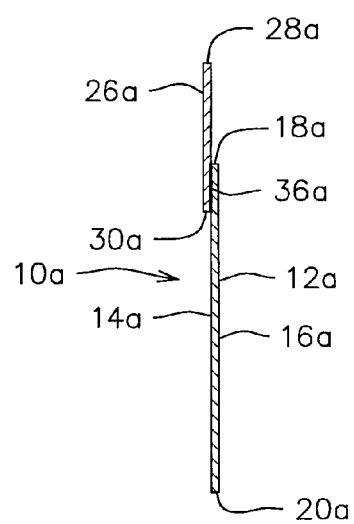
FIG. 3
FIG. 4

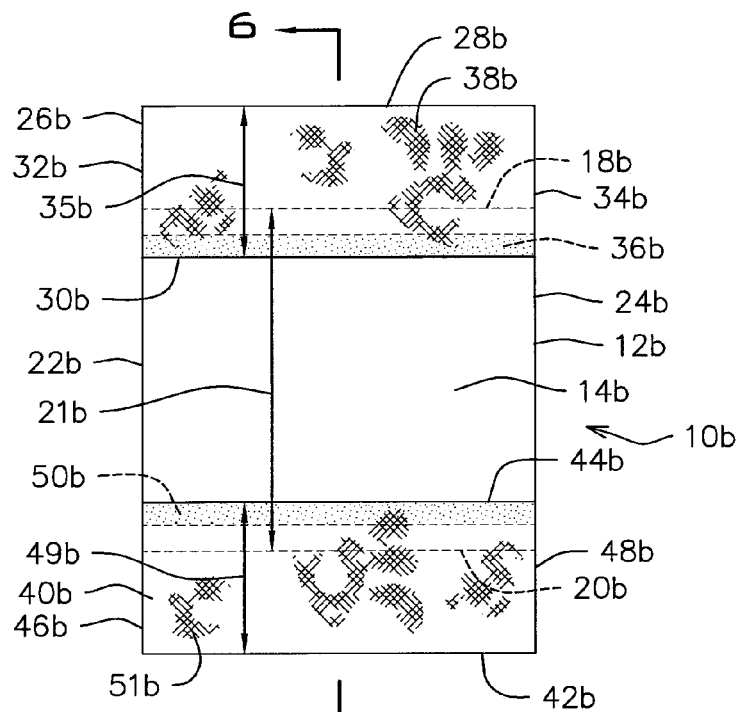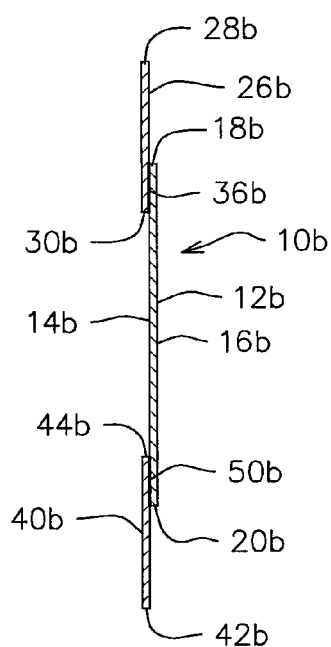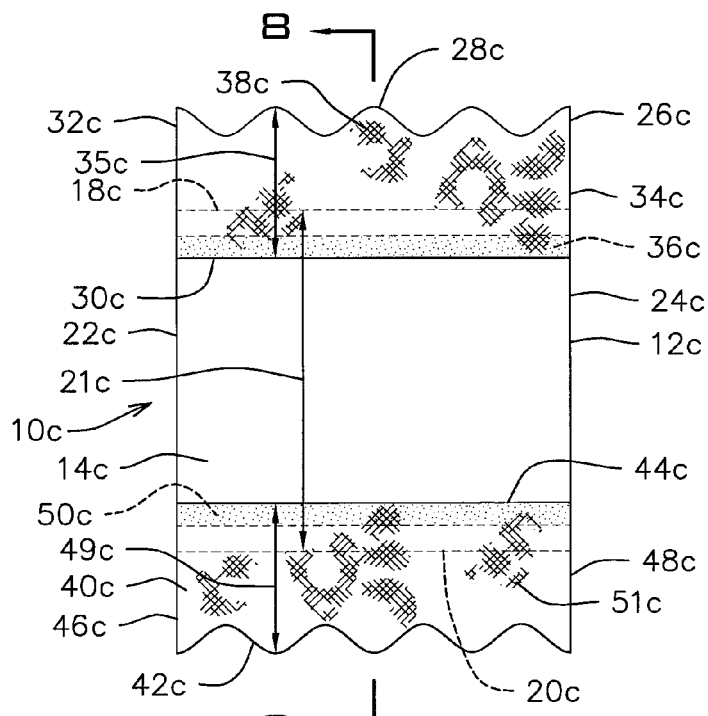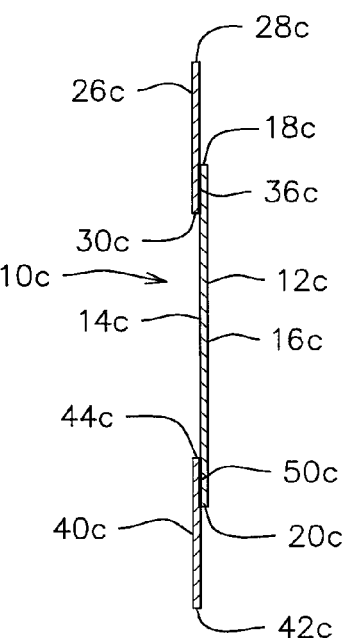

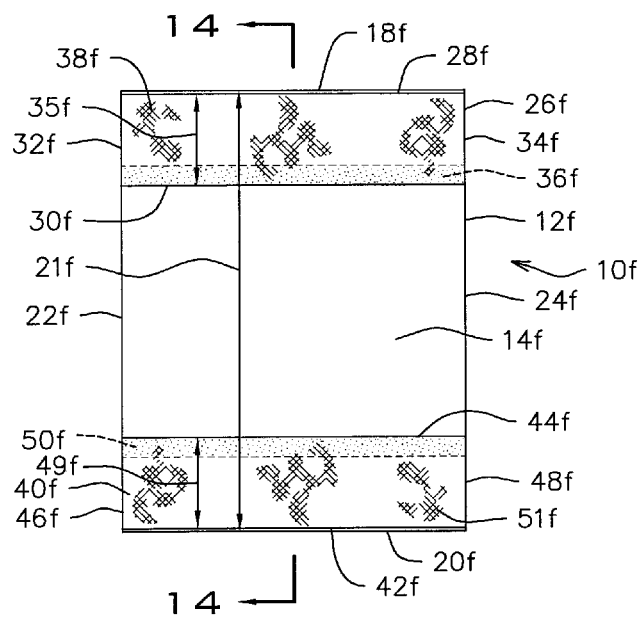
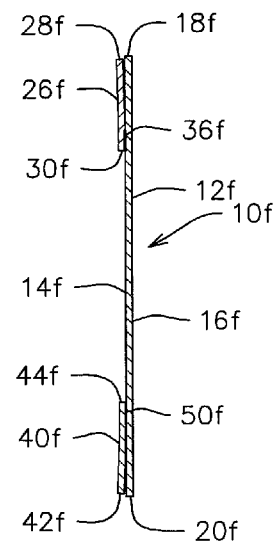
FIG. 13          FIG. 14
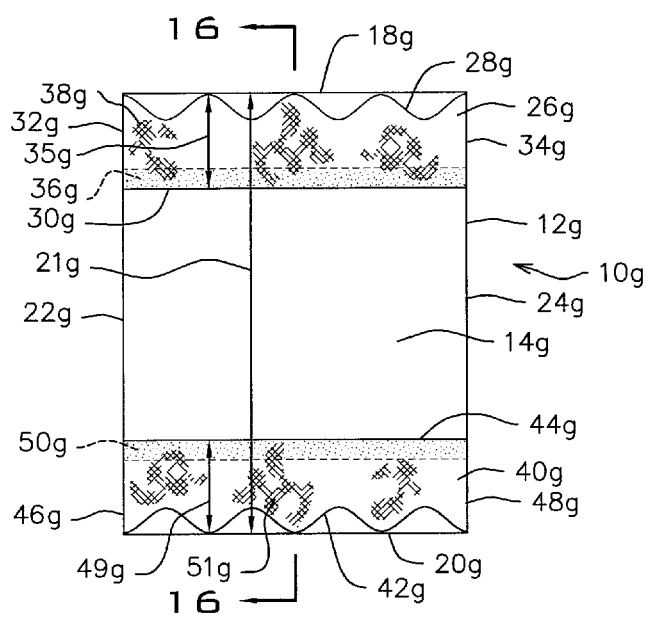
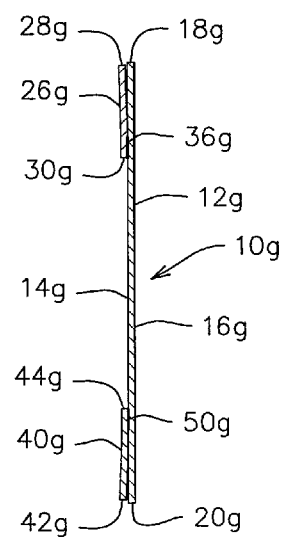
FIG. 15          FIG. 16

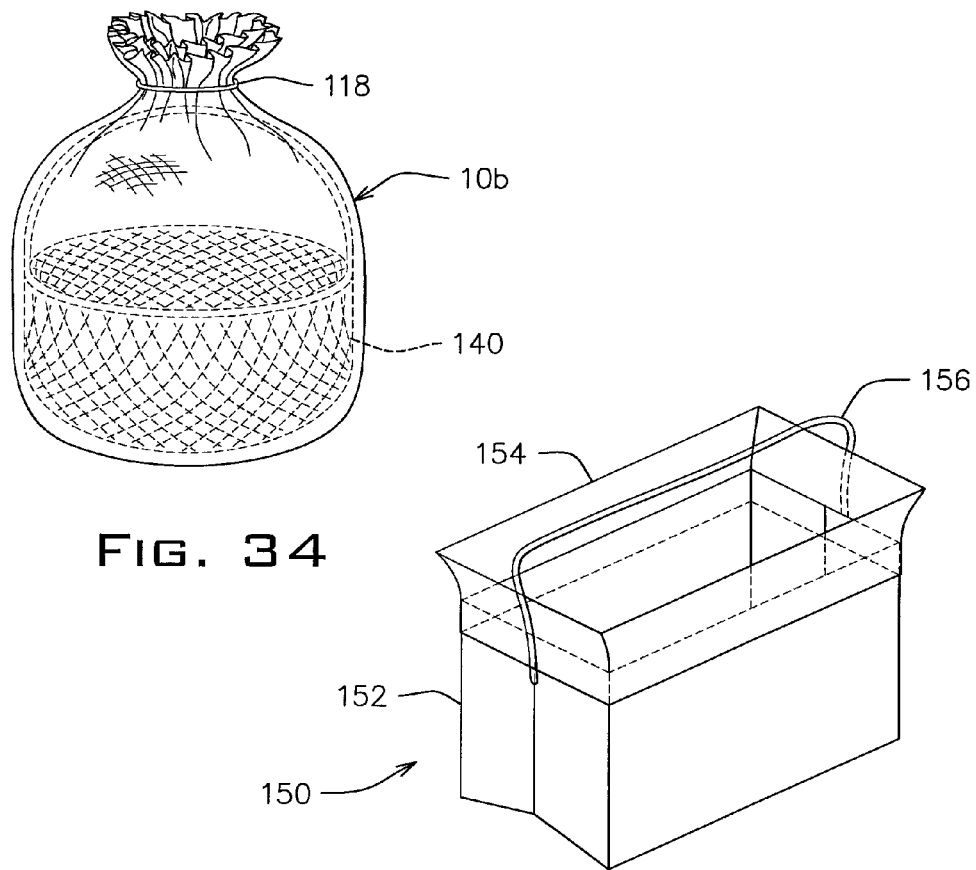
FIG. 34
FIG. 35
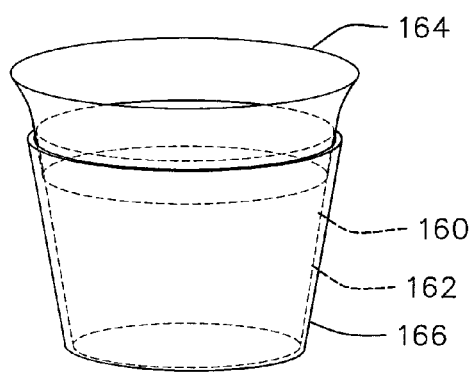
FIG. 36

WRAPPER WITH DECORATIVE EXTENSION AND METHOD

CROSS REFERENCE TO RELATED APPLICATIONS

The present application is a continuation of U.S. Ser. No. 12/787,536, filed May 26, 2010 now abandoned; which is a continuation of U.S. Ser. No. 12/231,092, filed Aug. 29, 2008, now abandoned; which is a continuation of U.S. Ser. No. 11/120,383, filed May 2, 2005, now abandoned; which is a continuation of U.S. Ser. No. 10/446,497, filed May 27, 2003, now abandoned; which is a continuation-in-part of U.S. Ser. No. 10/350,956, filed Jan. 23, 2003, now abandoned; which is a continuation-in-part of U.S. Ser. No. 10/135,334, filed Apr. 25, 2002, now abandoned. The entire contents of each of the above-referenced patents and patent applications are hereby expressly incorporated herein by reference.

BACKGROUND

The presently disclosed and claimed inventive concept(s) generally relates to but is not limited to, wrappers used to wrap items, including floral groupings and/or media, or flower pots containing floral groupings and/or media, and methods of using same.

BRIEF DESCRIPTION OF THE DRAWINGS

FIG. 1 is an elevational view of a wrapper of the presently disclosed and claimed inventive concept(s).

FIG. 2 is a cross-sectional view of the wrapper of FIG. 1.

FIG. 3 is an elevational view of an alternate embodiment of the wrapper of the presently disclosed and claimed inventive concept(s).

FIG. 4 is a cross-sectional view of the wrapper of FIG. 3.

FIG. 5 is an elevational view of an alternate embodiment of the wrapper of the presently disclosed and claimed inventive concept(s).

FIG. 6 is a cross-sectional view of the wrapper of FIG. 5.

FIG. 7 is an elevational view of an alternate embodiment of the wrapper of the presently disclosed and claimed inventive concept(s).

FIG. 8 is a cross-sectional view of the wrapper of FIG. 7.

FIG. 13 is an elevational view of an alternate embodiment of the wrapper of the presently disclosed and claimed inventive concept(s).

FIG. 14 is a cross-sectional view of the wrapper of FIG. 13.

FIG. 15 is an elevational view of an alternate embodiment of the wrapper of the presently disclosed and claimed inventive concept(s).

FIG. 16 is a cross-sectional view of the wrapper of FIG. 15.

FIG. 34 is a perspective view of a wrapper of the presently disclosed and claimed inventive concept(s) used to wrap a basket.

FIG. 35 is a perspective view of a gift bag constructed to have a decorative extension in accordance with the presently disclosed and claimed inventive concept(s).

FIG. 36 is a perspective view of a basket or container having a liner having a decorative extension in accordance with the presently disclosed and claimed inventive concept(s).

DETAILED DESCRIPTION OF THE PRESENTLY DISCLOSED AND CLAIMED INVENTIVE CONCEPT(S)

Figure 9:
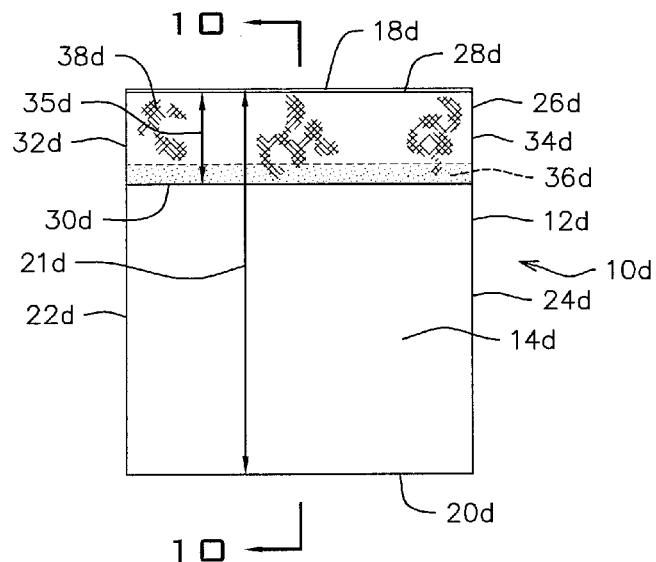
FIG. 9 is an elevational view of an alternate embodiment of the wrapper of the presently disclosed and claimed inventive concept(s).

The presently disclosed and claimed inventive concept(s) is a wrapper (also referred to herein as a "decorative wrapper") for decorating and covering flower pots, flower pots having floral groupings (plants) therein, floral groupings comprising cut flowers, corsages, floral groupings disposed in a "non-pot" floral holding material such as a foam or fiber block, and non-pot or non-plant items such as baskets, gifts, gift boxes, fruit or candy boxes, and other boxed or unboxed items including nuts, vegetables, plant bulbs, and comestibles. The wrappers contemplated herein could be used as a basket or box liner or as a decorative filler for a bag, gift bag, or box, rather than as a wrapper. The wrappers described herein could be used as a filler for a box or item to be shipped. The wrapper contemplated herein comprises a primary (first) sheet of material having at least one additional sheet of material attached thereto which comprises an extension of the primary sheet of material and which is generally adjacent to an edge of the primary sheet of material. The extension may or may not extend beyond the edge of the primary sheet of material. Preferably the extension has a lace pattern thereon, or the extension may have any other pattern thereon such as a floral pattern, or may not have a pattern but may instead have a color, texture, or other decorative effect. The wrapper described herein may be used also to produce a preformed pot cover, such as a Speed Cover™ formed for example by a mated mold system such as described in U.S. Pat. No. 4,773,182, which is hereby expressly incorporated by reference herein in its entirety.

In the presently disclosed and claimed inventive concept(s), the extension is attached to the primary (first) sheet of material via a continuous seal, or via a seal only having discrete or intermittent connections. When the wrapper is disposed about a potted plant, the decorative cover formed thereby has a decorative skirt or "ruffle" (also referred to herein as a skirt) which appears to have more than one layer. The decorative skirt is comprised of a portion of the extension and of an uppermost portion of the sheet of material near the outermost peripheral edge of the sheet of material thereby providing a decorative cover (and, thereby, a decoratively covered potted plant) which has the layered appearance of being comprised of two separate and different "whole" or "entire" decorative sheets of material. Previously, in order to achieve this "two-sheet" appearance, the user had to use two entire sheets of material, which were either separate or attached. If the sheets of material were separate, the user was required to obtain a first sheet of material then place a second sheet of material upon the first sheet of material then shift and move the second or first sheet about so as to achieve close or symmetric alignment of the edges of the sheets so as to provide a consistent and pleasing decorative effect of the two sheet cover when the combined two sheets of material were wrapped about a flower pot or other item. The process was even more difficult and time consuming when three or more sheets were used for obtaining a "three-sheet" (or more) appearance or layered effect. Further, the process of manually aligning separate sheets of material upon each other can be difficult due to the "clinginess" of polymer films.

The wrapper of the presently disclosed and claimed inventive concept(s) therefore enables the user to obtain the same "two-sheet" appearance or layered effect as obtained with two entirely separate or different sheets of material but without the extra effort and difficulties of having to manually align the two sheets and, moreover, without the higher expenses required when using two entire sheets. As described in more detail below (see FIG. 19-21), a user can obtain a "three-sheet" appearance by using a first sheet of material having a pair of adjacent extensions, (one overlapping the other) which extend from or near the same edge of the sheet of material. Users of the presently disclosed and claimed inventive concept(s), which comprises a sheet of material, and at least one narrower extension attached to and extending from the sheet of material, not only benefit from increased ease and consistency of application, but also enjoy considerable cost savings due to the significantly reduced labor and material costs obtained by employing sheets having the narrower extension already attached thereto and aligned therewith.

As noted above, the presently disclosed and claimed inventive concept(s) contemplates in a preferred version a wrapper made of a decorative sheet of material having a decorative extension attached thereto, and which may have a straight or non-linear upper edge and/or a straight or non-linear lower edge. The decorative extension may have a lace or lace-like appearance. The sheet of material may further comprise a detachable upper portion which may be sized to surround and encompass the floral grouping disposed within the flower pot. The upper portion when present may be detachable via a detaching element, including but not limited to, perforations, tear strips, weakened areas, or zippers.

Also, the wrapper may comprise an adhesive or cohesive bonding material disposed on an inner surface thereof for bondingly connecting the wrapper to the pot or for connecting portions of the wrapper together after the wrapper has been disposed about the flower pot. Alternately, a bonding material may be disposed on an outer surface of the wrapper for securing a crimped portion having a plurality of crimped folds formed in the wrapper about the flower pot or floral grouping to secure the wrapper about the pot.

These embodiments and others of the presently disclosed and claimed inventive concept(s) are now described in more detail below. It will be appreciated that the examples provided herein are not intended to limit the scope and extent of the presently disclosed and claimed inventive concept(s) but are only intended to exemplify various embodiments of the presently disclosed and claimed inventive concept(s) contemplated herein.

Shown in FIGS. 1-2 and designated therein by the general reference numeral 10 is a wrapper for wrapping a flower pot or a floral grouping or other items as described above and elsewhere herein. The wrapper 10 is constructed of a sheet of material 12 (also referred to herein as the first sheet of material) with a first surface 14, a second surface 16, a first edge 18, a second edge 20, a width 21, a first side 22, and a second side 24, and an extension 26 having an upper edge 28, a lower edge 30, a first side 32, a second side 34, and a width 35. The extension 26 is attached to the sheet of material 12 along a seal 36 and preferably is constructed from a sheet material having a decorative pattern, coloration, or appearance. The extension 26 is preferably attached or laminated via the seal 36 to portions of the first surface 14 of the sheet of material 12. The extension 26 preferably extends at least to or beyond the first edge 18 of the sheet of material 12, such as shown in FIG. 1. Further, the extension 26 is preferably attached near the first edge 18 of the sheet of material 12 of the wrapper 10 such that the location of the seal 36 is near or within several inches (within 0 to 6 inches for example) of the first edge 18 of the sheet of material 12. In a preferred embodiment, the extension 26 has a lace or lace-like pattern 38 disposed thereon. It will be understood however by one of ordinary skill in the art that the extension 26 may comprise any other decorative pattern thereon, or may not have a pattern, but may only be differently textured or colored. For example, the sheet of material 12 may be constructed of an opaque material having a color, decoration, or texture (or all of these, for example) while the extension 26 is constructed of a colored or decorated transparent polymeric film. The width 35 of extension 26 is preferably about 2% to 35% of the width 21 and is more preferably from 15%-25% the width thereof. Any image disposed on the extension 26 or any other extension or sheet of material described herein may be die cut or printed thereon or die cut or printed in register thereon.

The extension 26 is preferably laminated to the sheet of material 12 at the seal 36 via a heat seal or via an adhesive or cohesive seal but it will be understood that the extension 26 can be attached to the sheet of material 12 via any attaching, connecting, or lamination method as described elsewhere herein or as known to one of ordinary skill in the art.

In one embodiment, the first edge 28 of extension 26 preferably extends about one-half to four inches to six inches from the first edge 18 of sheet of material 12, and the second edge 30 of extension 26 generally extends from one-half to four to six inches on the first surface 14 of the sheet of material 12 below the first edge 18. Any or all of the portion of the extension 26 which faces and rests against the upper surface 14 may be secured by seal 36 to the sheet of material 12 however preferably the facing portion is only partially connected and preferably the seal 36 is only ¼ to ½ to one inch wide. The wrappers 10 (or any other wrappers described herein) may be supplied in a stack of individual wrappers 10, in a pad wherein the wrappers 10 are attached together, or in a roll, wherein individual wrappers 10 are separated from the roll via perforations preplaced into the webbing of the roll, or by separation via a cutting or shearing implement, or in a pad of separate wrappers 10 which is rolled about a stiff cylinder (such as cardboard) for easy removal. Wrapper 10 (or any of the wrappers described herein) may have a hole, slot, or perforations, therein (not shown) for insertion of the stem or stems of a floral grouping for enabling the wrapper 10 to be wrapped about a floral grouping without a pot. The hole, slot, or perforations may be located in any portion of the sheet of material 12 but preferably are located in a centrally disposed portion thereof or may be offset from the center.

Referring now to FIGS. 3-4, another wrapper embodied in the presently disclosed and claimed inventive concept(s) is designated therein by reference numeral 10*a*. Wrapper 10*a* is constructed of a sheet of material 12*a* with a first surface 14*a*, a second surface 16*a*, a first edge 18*a*, a second edge 20*a*, a width 21*a*, a first side 22*a*, and a second side 24*a*, and an extension 26*a* which has an upper edge 28*a*, a lower edge 30*a*, a first side 32*a*, a second side 34*a* and a width 35*a*. Preferably the width 35*a* is from 2% to 35% of the width 21*a* and more preferably from 15% to 25% of width 21*a*. The extension 26*a* is attached to the sheet of material 12*a* via a seal 36*a*, and preferably has a pattern 38*a* thereon. The wrapper 10*a* is essentially the same as wrapper 10 described previously except the upper edge 28*a* of extension 26*a* is non-linear (e.g., curvilinear) rather than straight. Although the upper edge 28*a* is shown as having a curvilinear non-linear pattern, it will be understood that the upper edge 28*a* may have any non-linear pattern, such as a geometric pattern, for example, sine wave, arced, toothed, angular, crenellate, crenate, crenellated, scalloped, starred, or may have a combination of a linear and non-linear pattern or an irregular pattern. In another embodiment (not shown) of wrapper 10*a*, the lower edge 30*a* of extension 26*a* may be non-linear in a manner similar to upper edge 28*a* of extension 26*a*. Alternatively, in another embodiment of the presently disclosed and claimed inventive concept(s), the upper edge 28*a* of wrapper 10*a* may be straight, such as shown in wrapper 10 of FIG. 1, while only the lower edge 30*a* of extension 26*a* is non-linear. The upper edge 28*a* (as well as upper edges of any extensions contemplated herein) may have a biomorphic shape such as a face, animal, flower, rabbit, Santa Claus, egg, or other image printed thereon or present as a shape within the upper edge 28*a*.

Referring now to FIGS. 5-6, shown therein and designated by the general reference numeral 10*b* is a wrapper for wrapping a flower pot or floral grouping which is essentially similar to wrapper 10 except as described below. The wrapper 10*b* is constructed of a sheet of material 12*b* having a first surface 14*b*, a second surface 16*b*, a first edge 18*b*, a second edge 20*b*, a width 21*b*, a first side 22*b*, a second side 24*b*, a first extension 26*b*, and a second extension 40*b*.

The first extension 26*b* has a first edge 28*b*, a second edge 30*b*, a first side 32*b*, a second side 34*b* and a width 35*b*. The first extension 26*b* is attached to a portion of the sheet of material 12*b* via a seal 36*b*, and preferably has a pattern 38*b* or decorative appearance, effect, or edge thereon as discussed above regarding wrappers 10-10*a*. The second extension 40*b* has a first edge 42*b*, a second edge 44*b*, a first side 46*b*, a second side 48*b* and a width 49*b*. The second extension 40*b* is attached to a portion of the sheet of material 12*b* via a seal 50*b* and preferably has a pattern 51*b* or decorative appearance, effect, or edge thereon as discussed previously for wrappers 10-10*a*. Preferably the width 35*b* and the width 49*b* are each from 2% to 35% of width 21*b*, more preferably from 15% to 25% of width 21*b*.

The first extension 26*b* is attached to the sheet of material 12*b* in a manner such that the first edge 28*b* of the first extension 26*b* extends to (is flush with) or extends beyond the first edge 18*b* of the sheet of material 12*b* and the second extension 40*b* is attached to the sheet of material 12*b* such that the first edge 42*b* of the second extension 40*b* extends to (is flush with) or extends beyond the second edge 20*b* of the sheet of material 12*b*. Preferably first extension 26*b* and second extension 40*b* are constructed of the same material and/or have the same pattern, color, appearance or decorative effect. Alternatively, first and second extensions 26*b* and 40*b* may be constructed of different materials and/or may have different patterns, shapes, designs, colors, appearances or decorative effects as described elsewhere herein.

Figure 18:
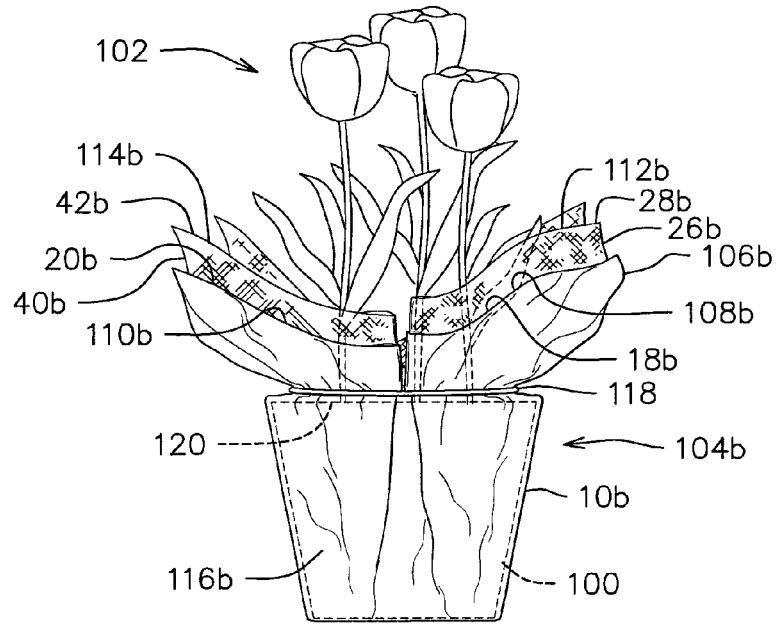
FIG. 18 is a perspective view of a potted plant covered by the wrapper of FIG. 5.

In any event, the wrapper 10*b* when wrapped about the pot 100 provides a decorative cover for the pot 100 which has an appearance of being constructed of at least two entirely separate sheets of material, thereby enhancing the decorative effect of the wrapper 10*b* as discussed elsewhere herein and as shown, for example, in FIG. 18.

Referring now to FIGS. 7-8, shown therein and designated by the general reference numeral 10*c* is a wrapper for wrapping a flower pot or floral grouping which is essentially similar to wrapper 10*b* except as described below. The wrapper 10*c* is constructed of a sheet of material 12*c* having a first surface 14*c*, a second surface 16*c*, a first edge 18*c*, a second edge 20*c*, a width 21*c*, a first side 22*c*, a second side 24*c*, a first extension 26*c*, and a second extension 40*c*.

The first extension 26*c* has a first edge 28*c*, a second edge 30*c*, a first side 32*c*, a second side 34*c*, and a width 35*c*. The first extension 26*c* is attached to a portion of the sheet of material 12*c* via a seal 36*c*, and preferably has a pattern 38*c* thereon as discussed above regarding wrappers 10-10*b*. The second extension 40*c* has a first edge 42*c*, a second edge 44*c*, a first side 46*c*, a second side 48*c*, and a width 49*c*. The second extension 40*c* is attached to a portion of the sheet of material 12*c* via a seal 50*c* and preferably has a pattern 51*c* thereon as discussed previously. Preferably the width 35*c* and width 49*c* are 2% to 35% of the width 21*c*, more preferably from 15% to 25% of width 21*c*.

The first extension 26*c* is attached to the sheet of material 12*c* in a manner such that the first edge 28*c* of the first extension 26*c* extends to or beyond the first edge 18*c* of the sheet of material 12*c* and the second extension 40*c* is attached to the sheet of material 12*c* such that the first edge 42*c* of the second extension 40c extends to or beyond the second edge 20c of the sheet of material 12c. Wrapper 10c differs from wrapper 10b primarily in that the first edge 28c of first extension 26c and the first edge 42c of the second extension 40c are non-linear (as defined elsewhere herein), rather than straight.

Also contemplated herein by the presently disclosed and claimed inventive concept(s) are embodiments of a wrapper similar to wrapper 10c having a first extension and a second extension except wherein only one, rather than both, of the extensions has a non-linear edge (not shown).

Figure 10:
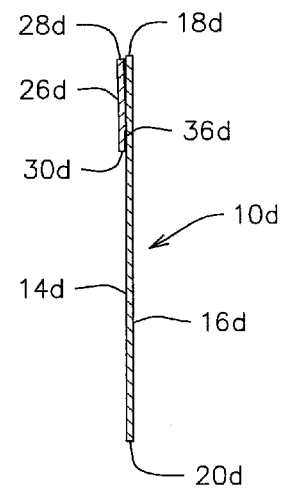
FIG. 10 is a cross-sectional view of the wrapper of FIG. 9.

Referring now to FIGS. 9 and 10, shown therein and designated by the general reference numeral 10d is a wrapper for wrapping a flower pot or floral grouping and which is similar to wrapper 10 except as described below. The wrapper 10d is constructed of a sheet of material 12d having a first surface 14d, a second surface 16d, a first edge 18d, a second edge 20d, a width 21d, a first side 22d, a second side 24d, and an extension 26d.

The extension 26d has a first edge 28d, a second edge 30d, a first side 32d, a second side 34d, and a width 35d. The extension 26d is attached to a portion of the sheet of material 12d via a seal 36d, and preferably has a pattern 38d thereon as discussed above regarding wrappers 10-10c. Width 35d is preferably 2% to 35% of width 21d, more preferably from 15% to 25% of width 21d.

Wrapper 10d is similar to wrapper 10 except that the first edge 28d of the extension 26d does not extend beyond the first edge 18d of the sheet of material 12d but rather is positioned a distance below the first edge 18d, for example but not by limitation, from one-quarter inch to four to six inches below.

Figure 11:
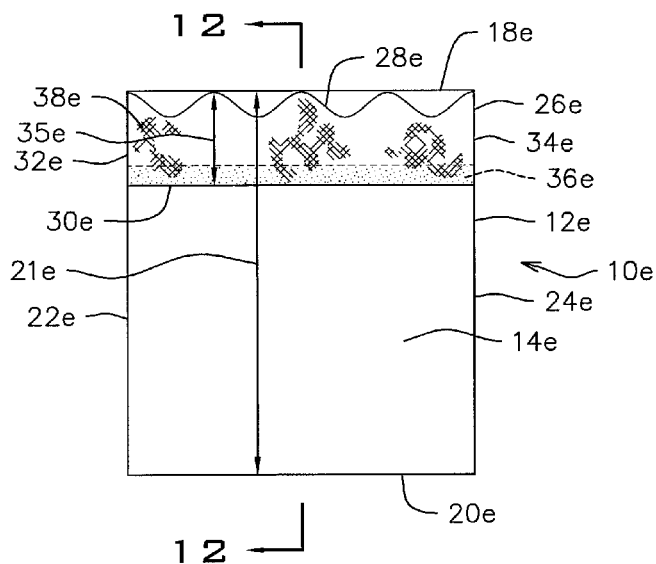
FIG. 11 is an elevational view of an alternate embodiment of the wrapper of the presently disclosed and claimed inventive concept(s).
Figure 12:
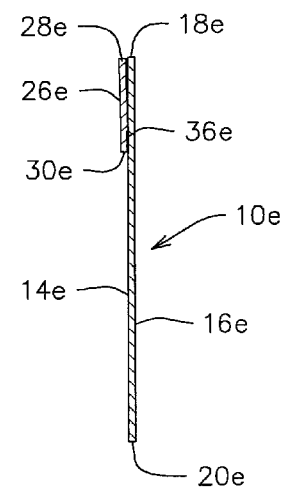
FIG. 12 is a cross-sectional view of the wrapper of FIG. 11.

Referring now to FIGS. 11-12, shown therein and designated by the general reference numeral 10e is a wrapper for wrapping a flower pot or floral grouping, and which is similar to wrapper 10d except as described below. The wrapper 10e is constructed of a sheet of material 12e having a first surface 14e, a second surface 16e, a first edge 18e, a second edge 20e, a width 21e, a first side 22e, a second side 24e, and an extension 26e. The extension 26e has a first edge 28e, a second edge 30e, a first side 32e, a second side 34e, and a width 35e. The extension 26e is attached to a portion of the sheet of material 12e via a seal 36e and preferably has a pattern 38e thereon as discussed above regarding wrappers 10-10d. Width 35e is preferably 2% to 35% of width 21e, more preferably from 15% to 25% of width 21e.

Wrapper 10e is similar to wrapper 10d except that the first edge 28e of the extension 26e is non-linear (as defined elsewhere herein) rather than straight. In an alternative embodiment (not shown), the first edge 18e of the sheet 12e is also non-linear.

Referring now to FIGS. 13-14, shown therein and designated by the general reference numeral 10f is a wrapper for wrapping a flower pot or floral grouping, the wrapper similar to wrapper 10b except as described below. The wrapper 10f is constructed of a sheet of material 12f having a first surface 14f, a second surface 16f, a first edge 18f, a second edge 20f, a width 21f, a first side 22f, a second side 24f, a first extension 26f, and a second extension 40f.

The first extension 26f has a first edge 28f, a second edge 30f, a first side 32f, and a second side 34f, and a width 35f. The first extension 26f is attached to a portion of the sheet of material 12f via a seal 36f, and preferably has a pattern 38f thereon as discussed above regarding wrappers 10-10e. The second extension 40f has a first edge 42f, a second edge 44f, a first side 46f, a second side 48f, and a width 49f. The second extension 40f is attached to a portion of the sheet of material 12f via a seal 50f and preferably has a pattern 51f thereon as discussed previously. The width 35f and width 49f are preferably 2% to 35% of width 21f, more preferably from 15% to 25% of width 21f.

The first extension 26f is attached to the sheet of material 12f in a manner that is similar to first extension 26b of wrapper 10b except that the first edge 28f of the first extension 26f does not extend beyond the first edge 18f of the sheet of material 12f and the second extension 40f is attached to the sheet of material 12f such that the first edge 42f of the second extension 40f does not extend beyond the second edge 20f of the sheet of material 12f.

In an alternative embodiment of wrapper 12f, which is not shown herein, either one or both of first edge 18f and second edge 20f of sheet of material 12f may be non-linear. Similarly, either one or both of first side 22f and second side 24f may be non-linear. Similarly, either or both of second edge 30f of first extension 26f and second edge 44f of second extension 40f may be non-linear in any of the afore-mentioned embodiments.

Referring now to FIGS. 15-16, shown therein and designated by the general reference numeral 10g is a wrapper for wrapping a flower pot or floral grouping, which is similar to wrappers 10c or 10f except as described below. The wrapper 10g is constructed of a sheet of material 12g having a first surface 14g, a second surface 16g, a first edge 18g, a second edge 20g, a width 21g, a first side 22g, a second side 24g, a first extension 26g, and a second extension 40g.

The first extension 26g has a first edge 28g, a second edge 30g, a first side 32g, a second side 34g, and a width 35g. The first extension 26g is attached to a portion of the sheet of material 12g via a seal 36g, and preferably has a pattern 38g thereon as discussed above regarding wrappers 10-10f. The second extension 40g has a first edge 42g, a second edge 44g, a first side 46g, a second side 48g, and a width 49g. The second extension 40g is attached to a portion of the sheet of material 12g via a seal 50g and preferably has a pattern 51g thereon as discussed previously. The first edge 28g of first extension 26g and the first edge 42g of second extension 40f are both non-linear rather than straight (as seen in wrapper 10f). The width 35g and width 49g are each preferably from 2% to 35% of width 21g, more preferably from 15% to 25% of width 21g.

Wrapper 10g is similar to wrapper 10c except the first extension 26g is attached to the sheet of material 12g in a manner such that the first edge 28g of the first extension 26g does not extend beyond the first edge 18g of the sheet of material 12g and the second extension 40g is attached to the sheet of material 12g such that the first edge 42g of the second extension 40g does not extend beyond the second edge 20g of the sheet of material 12g.

In an alternative embodiment of wrapper 10g which is not shown herein, either or both of the first edge 18g and the second edge 20g of sheet of material 12g may be non-linear. Similarly, either one or both of the first side 22g and second side 24g may be non-linear. In any of the afore-mentioned embodiments, either or both of the second edge 30g of first extension 26g and second edge 44g of second extension 40g may be non-linear.

Figure 17:
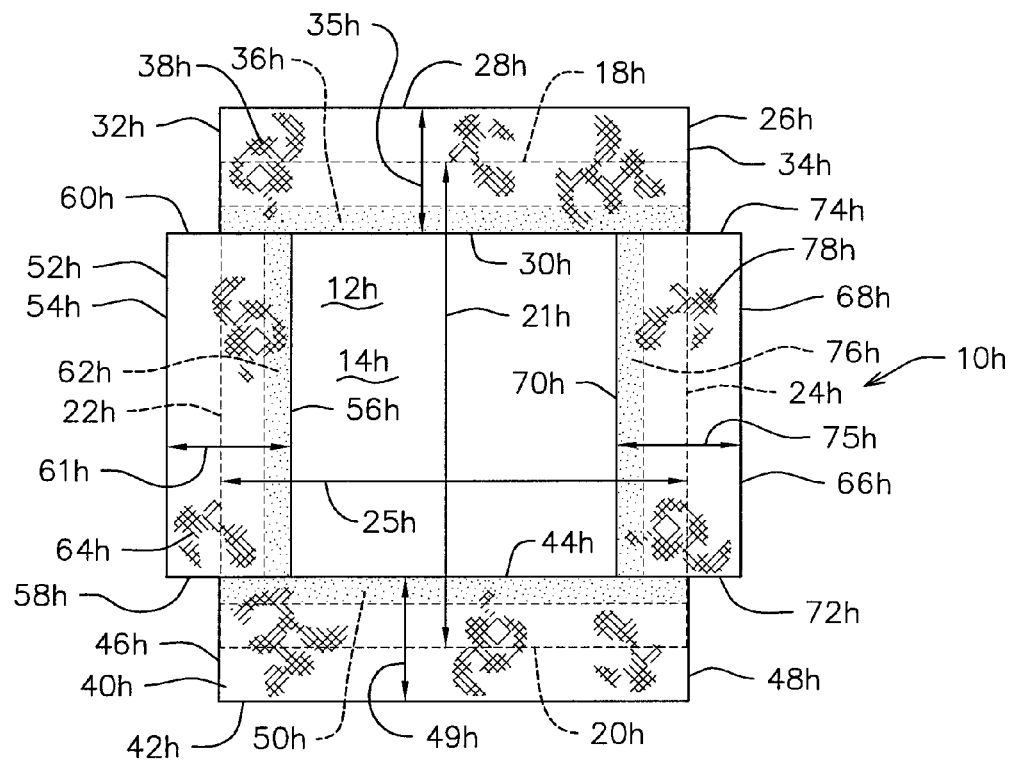
FIG. 17 is an elevational view of an alternate embodiment of the wrapper of the presently disclosed and claimed inventive concept(s).

Referring now to FIG. 17, shown therein and designated by the general reference numeral 10h is a wrapper for wrapping a flower pot or floral grouping and which is similar to wrapper 10b except as described below. The wrapper 10h is constructed of a sheet of material 12h having a first surface 14h, a second surface 16h (not shown), a first edge 18h, a second edge 20h, a first side 22h, a second side 24h, a width 25h, a first extension 26h, a second extension 40h, a third extension 52h and a fourth extension 66h.

The first extension 26h has a first edge 28h, a second edge 30h, a first side 32h, a second side 34h, and a width 35h. The first extension 26h is attached to a portion of the sheet of material 12h via a seal 36h, and preferably has a pattern 38h thereon as discussed above regarding wrappers 10-10g. The second extension 40h has a first edge 42h, a second edge 44h, a first side 46h, a second side 48h, and a width 49h. The second extension 40h is attached to a portion of the sheet of material 12h via a seal 50h and preferably has a pattern 51h thereon as discussed previously.

The third extension 52h has a first edge 54h, a second edge 56h, a first side 58h, a second side 60h, and a width 61h. The third extension 52h is attached to a portion of the sheet of material 12h via a seal 62h and preferably has a pattern 64h thereon, as discussed above regarding wrappers 10-10g. The fourth extension 66h has a first edge 68h, a second edge 70h, a first side 72h, a second side 74h, and a width 75h. The fourth extension 66h is attached to a portion of the sheet of material 12h via a seal 76h and preferably has a pattern 78h thereon, as discussed previously. Preferably each of widths 35h, 49h, 61h and 75h is 2% to 35% of width 21h, more preferably 15% to 25% of width 21h.

The first extension 26h is attached to the sheet of material 12h in a manner such that the first edge 28h of the first extension 26h extends to or beyond the first edge 18h of the sheet of material 12h. The second extension 40h is attached to the sheet of material 12h such that the first edge 42h of the second extension 40h extends to or beyond the second edge 20h of the sheet of material 12h.

The third extension 52h is attached to the sheet of material 12h in a manner such that the first edge 54h of the third extension 52h extends to or beyond the first side 22h of sheet of material 12h. The fourth extension 66h is attached to the sheet of material 12h in a manner such that the first edge 68h of the fourth extension 66h extends to or beyond the second side 24h of the sheet of material 12h.

In an alternative embodiment of the wrapper 10h, not shown herein, the first edges 28h, 42h, 54h and 68h of extensions 26h, 40h, 52h and 66h, respectively, may be positioned so as to not extend to or beyond first edge 18h, second edge 20h, first side 22h and/or second side 24h, respectively, of sheet of material 126, in a manner similar to wrappers 10d-10g.

In another alternative embodiment of the wrapper 10h, or of any embodiment not explicitly shown herein, any one or all of the first edges 28h, 42h, 54h, and 68h may be non-linear. Similarly, any one or all of the first edge 18h, second edge 20h, first side 22h and/or second side 24h, respectively, of the sheet of material 12h may be non-linear.

Referring now to FIG. 18, shown therein and referred to by the general reference numeral 104b is a decorative cover formed when wrapper 10b is disposed about a pot 100 having a floral grouping 102 disposed therein. When the wrapper 10b is formed about the pot 100, a skirt 106b is formed in the decorative cover 104b. The skirt 106b has a first upper peripheral edge 108b formed by first edge 18b of sheet of material 12b, a second upper peripheral edge 110b formed by second edge 20b of sheet of material 12b, a third upper peripheral edge 112b formed by first edge 28b of extension 26b and a fourth upper peripheral edge 114b formed by first edge 42b of the second extension 40b. The decorative cover 104b formed by wrapper 10b has an outer peripheral surface 116b.

The decorative cover 104b may be secured about the pot 100 by a securing element 118, such as a string, ribbon, band, stribbon, wire or any other element defined elsewhere herein as a securing element. The securing element 118 may be applied about the pot 100 and decorative cover 104b either manually or automatically. Further, the securing element 118 is shown in FIG. 18 as positioned about the decorative cover 104b above an upper rim 120 of the pot 100, but alternatively the securing element 118 may be positioned at or below the upper rim 120 of the pot 100.

Figure 19:
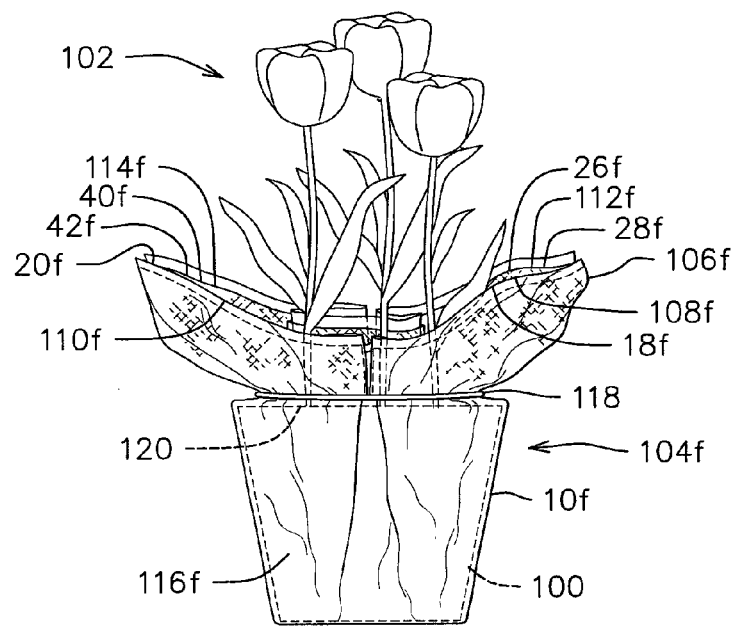
FIG. 19 is a perspective view of a potted plant covered by the wrapper of FIG. 13.

Referring now to FIG. 19, shown therein and referred to by the general reference numeral 104f is a decorative cover formed when wrapper 10f is disposed about the pot 100 having floral grouping 102 disposed therein. When the wrapper 10f is formed about the pot 100, a skirt 106f is formed in the decorative cover 104f. The skirt 106f has a first upper peripheral edge 108f formed by first edge 18f of sheet of material 12f, a second upper peripheral edge 110f formed by second edge 20f of sheet of material 12f, a third upper peripheral edge 112F formed by first edge 28f of first extension 26f, and a fourth upper peripheral edge 114f formed by first edge 42f of second extension 40f. The first and second upper peripheral edges 108f and 110f are above, or substantially flush with the third and fourth upper peripheral edges 112f and 114f. The third and fourth upper peripheral edges 112f and 114f are more or less nested within first and second upper peripheral edges 108f and 110F, respectively. The decorative cover 104f has an outer peripheral surface 116f and may be secured about the pot 100 by the securing element 118 in a position at, above, or below the upper rim 120 of the pot 100 as described previously elsewhere herein for decorative cover 104b.

Figure 20:
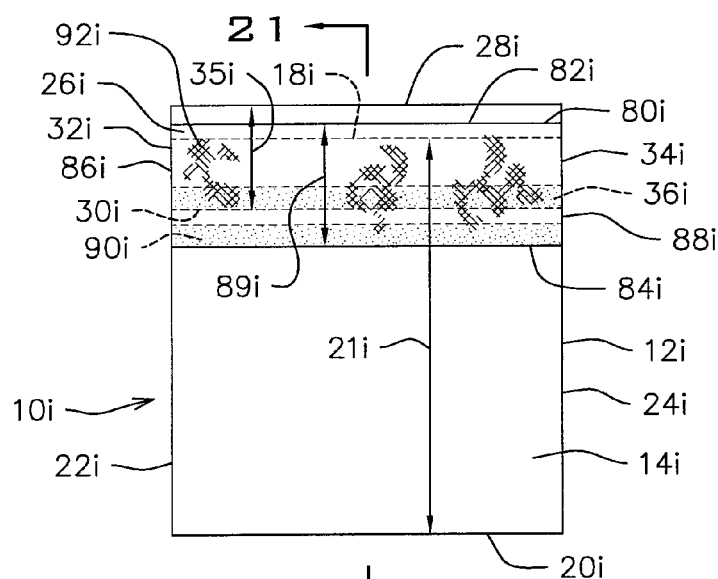
FIG. 20 is an elevational view of an alternate embodiment of the wrapper of the presently disclosed and claimed inventive concept(s).
Figure 21:
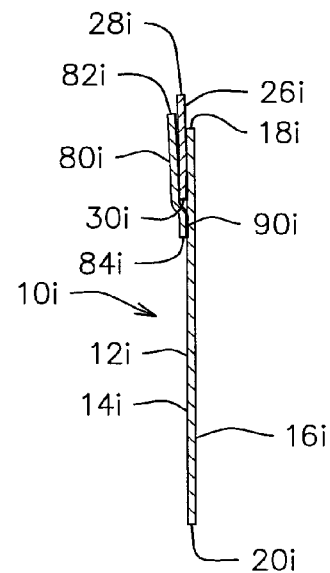
FIG. 21 is a cross-sectional view of the wrapper of FIG. 20.

Referring now to FIGS. 20 and 21, shown therein and designated by the general reference numeral 10i is a wrapper for wrapping a flower pot or floral grouping and which is similar to wrapper 10 except as described below. The wrapper 10i is constructed of a sheet of material 12i having a first surface 14i, a second surface 16i, a first edge 18i, a second edge 20i, a width 21i, a first extension 26i and an overlapping extension 80i.

The first extension 26i has a first edge 28i, a second edge 30i, a first side 32i, a second side 34i, and a width 35i. The first extension 26i is attached to a portion of the sheet of material 12i via a seal 36i and preferably has a pattern 38i thereon or other decorative effect. The overlapping extension 80i has a first edge 82i, a second edge 84i, a first side 86i, a second side 88i, and a width 89i. The overlapping extension 80i is attached to a portion of the sheet of material 12i via a seal 90i and preferably has a pattern 92i thereon. Each of widths 35i and 89i are preferably from 2% to 35% of width 21i, more preferably from 15% to 25% of width 21i.

As shown in FIGS. 20 and 21, the first extension 26i and the overlapping extension 80i are attached to the sheet of material 12i in an adjacent position. The overlapping extension 80i may be sealed to the first extension 26i rather than to the first surface 14i of the sheet of material 12i. In FIGS. 20 and 21, first extension 26i and overlapping extension 80i are shown as extending beyond first edge 18i of sheet of material 12i but in an alternative embodiment only one or neither of the first extension 26i and the overlapping extension 80i may extend beyond the first edge 18i. Alternatively any one or all of first edges 18i, 28i or 82i may be non-linear, rather than straight, for example, as shown in FIGS. 4 and 11.

Figure 22:
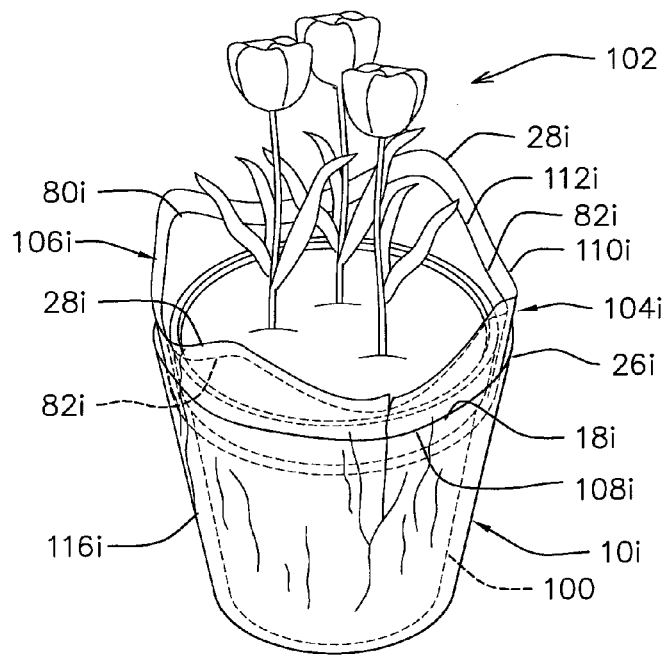
FIG. 22 is a perspective view of a potted plant covered by the wrapper of FIG. 20.

Referring now to FIG. 22, shown therein and referred to by the general reference numeral 104i is a decorative cover formed when wrapper 10i is disposed about pot 100 having floral grouping 102 disposed therein. When the wrapper 10i is formed about the pot 100, a skirt 106i is formed in the decorative cover 104i. The skirt 106i has a first upper peripheral edge 108i formed by first edge 18i of sheet of material 12i, a second upper peripheral edge 110i formed by first edge 28i of first extension 26i and a third upper peripheral edge 112i formed by first edge 82*i* of overlapping extension 80*i*. The portion of skirt 106*i* having third upper peripheral edge 112*i* is generally nested within the portion of skirt 106*i* having second upper peripheral edge 110*i*, which is nested within the portion of skirt 106*i* having first upper peripheral 108*i*. The decorative cover 104*i* formed by wrapper 10*i* has an outer peripheral surface 116*i*.

Any of the wrappers 10-10*i* described elsewhere herein, or alternative embodiments thereof not explicitly shown, may be disposed about the pot 100 (or floral grouping) in a manner similar to that shown in FIGS. 18, 19 and 22, either by placing the pot 100 (or floral grouping) upon a portion of the first surface 14-14*i* of wrappers 10-10*i*, or by wrapping the wrappers 10-10*i* circumferentially about the pot 100 (or floral grouping) then preferably folding portions of the wrappers 10-10*i* beneath the pot 100 (or floral grouping), thereby forming a decorative cover from wrappers 10-10*i*.

In alternative embodiments which are not shown herein, any of the wrappers shown or described herein may be equipped with an overlapping extension such as shown herein in FIGS. 19-20. Alternatively, any of the wrappers shown or described herein may be equipped with one or more additional overlapping extensions (e.g., two, three, four, or more).

Figure 23:
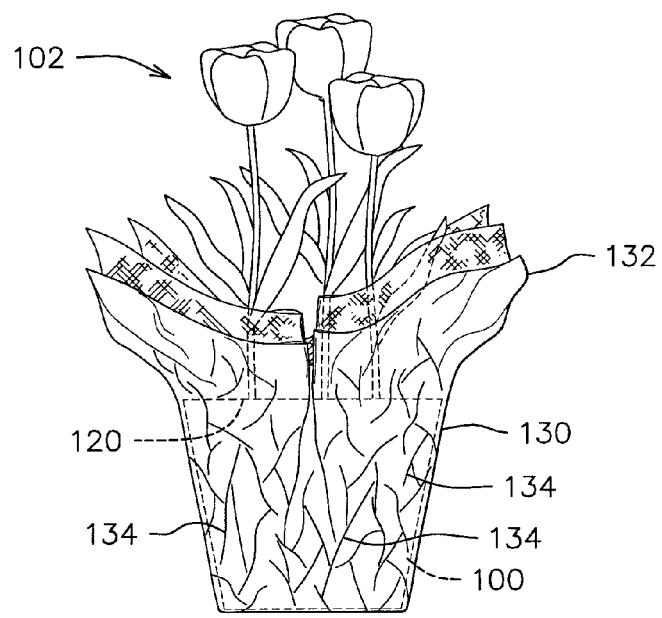
FIG. 23 is a perspective view of a preformed pot cover formed from the wrapper of FIG. 5 and having a potted plant disposed therein.

Shown in FIG. 23 and referred to therein by the general reference numeral 130 is a preformed pot cover formed from wrapper 10*b* of FIG. 5. Wrapper 10*b* is preformed into preformed pot cover 130 by methods well known in the art, including, but not limited to, the method shown in U.S. Pat. No. 4,773,182, the specification of which is hereby expressly incorporated by reference herein in its entirety. Preformed pot cover 130 has a decorative skirt 132 similar to skirt 106*b* of decorative cover 104*b* of FIG. 5 except preformed pot cover 130 has a preformed shape having randomly positioned (or alternatively, non-randomly positioned) connected overlapping folds 134 and an inner space into which pot 100 can be disposed without the necessity of physically forming the flat wrapper 10*b* about the pot 100 as is required to form the decorative cover 104*b*. The preformed pot cover 130 is formed and held into a self-sustaining shape by virtue of the connected overlapping folds 134.

In one embodiment, the presently disclosed and claimed inventive concept(s) contemplates a method of providing a decorative cover for an item such as a potted plant, floral grouping, or other item described or contemplated herein wherein the method comprises providing one or more of any of the decorative wrappers described herein, and selling and delivering the decorative wrapper to a producer or seller of items for producing a decoratively covered item by the producer or seller, wherein the decoratively covered item is capable of being produced by wrapping a single (or more than one) decorative wrapper about the item and securing the single (or more than one) decorative wrapper in place about the item via a securing element as described elsewhere herein (or by simply forming the decorative wrapper about the item if the decorative wrapper is formed from a deadfold material wherein the decorative wrapper is not necessarily secured about the item by a separate securing element) thereby providing the decorative cover about the item and wherein the decoratively covered item able to be so produced has an appearance of an item wrapped by at least two separate sheets of material.

The sheet of material of any of the wrappers described herein may be constructed to have any effective or decorative shape, such as a square, a rectangle, a polygon, a circle, an oval, a triangle, star, or other shape. For example the sheet of material may have a sine wave, scalloped, toothed, or other shape comprising its border. Similarly, the extension used to construct any of the wrappers described herein may have any shape, such as those shapes described above. In fact, the sheet of material and extension may be the same size or nearly the same size but are offset in relation to each other so that the respective borders or edges of the sheet of material are non-congruent, thereby providing the "two-sheet" or "multiple-sheet" effect described herein. Alternatively, the borders or edges of the sheet of material and extension may be congruent but the sheet of material and extension are only partially connected so that the sheet of material and extension are at least partially separated thereby providing the "two-sheet" or "multiple-sheet" effect described herein.

Figure 24:
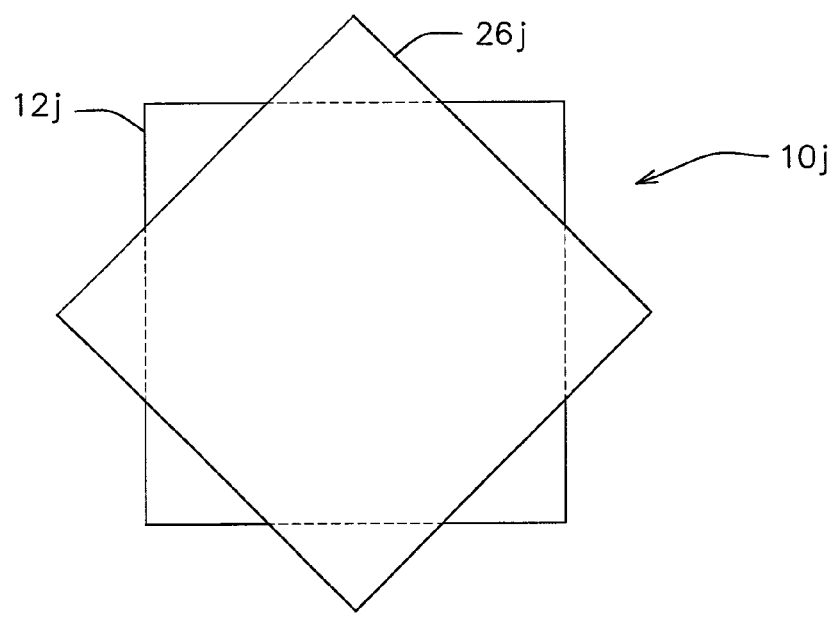
FIG. 24 is an elevational view of another embodiment of the wrapper of the presently disclosed and claimed inventive concept(s).

Referring now to FIG. 24, shown therein and designated by the reference numeral 10*j* is a wrapper which is essentially similar in construction and use to the other wrappers described elsewhere herein except as described below. Wrapper 10*j* comprises a first sheet of material 12*j* and a second sheet of material 26*j* which comprises an extension. The second sheet of material 26*j* is attached to or laminated to first sheet of material 12*j* as described elsewhere herein but is offset such that corners of the second sheet of material 26*j* extend past edges of the first sheet of material 12*j*.

Figure 25:
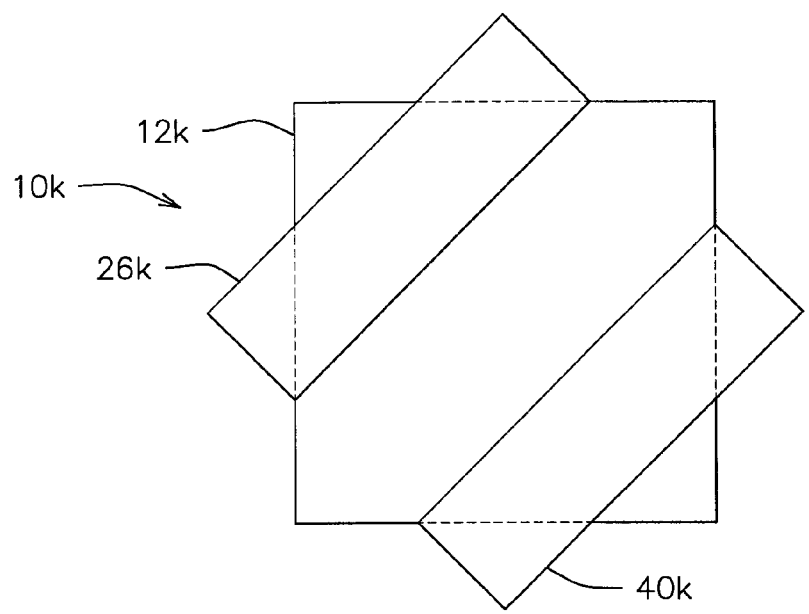
FIG. 25 is an elevational view of another embodiment of the wrapper of the presently disclosed and claimed inventive concept(s).

Referring now to FIG. 25, shown therein and designated by the reference numeral 10*k* is a wrapper which is essentially similar in construction and use to the other wrappers described elsewhere herein except as described below. Wrapper 10*k* comprises a sheet of material 12*k*, a first extension 26*k* and a second extension 40*k*, wherein the first extension 26*k* and 40*k* are attached to and are offset diagonally upon sheet of material 12*k* such that corners of first extension 26*k* and second extension 40*k* extend past edges of the sheet of material 12*k*.

Figure 26:
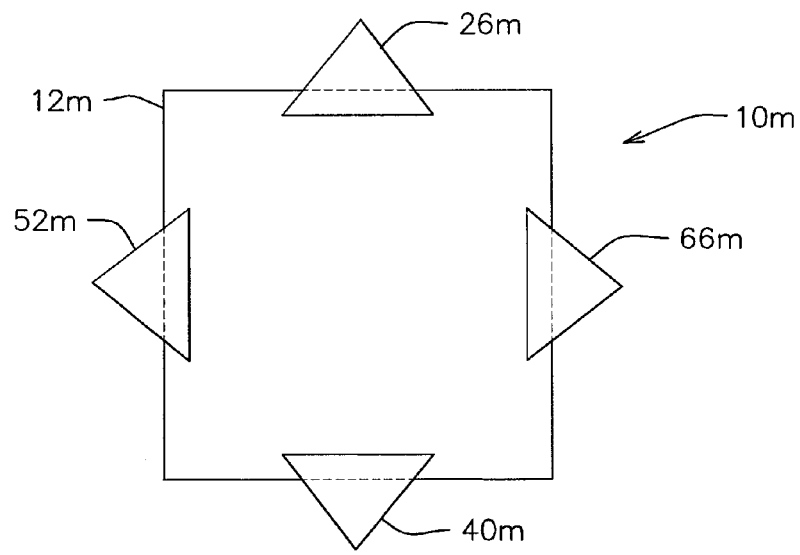
FIG. 26 is an elevational view of another embodiment of the wrapper of the presently disclosed and claimed inventive concept(s).

Referring now to FIG. 26, shown therein and designated by the reference numeral 10*m* is a wrapper which is essentially similar in construction and use to the other wrappers described elsewhere herein except as described below. Wrapper 10*m* comprises a sheet of material 12*m* and four triangular extensions 26*m*, 40*m*, 52*m*, and 66*m* which are attached to sheet of material 12*m* and extend past edges thereof.

Figure 27:
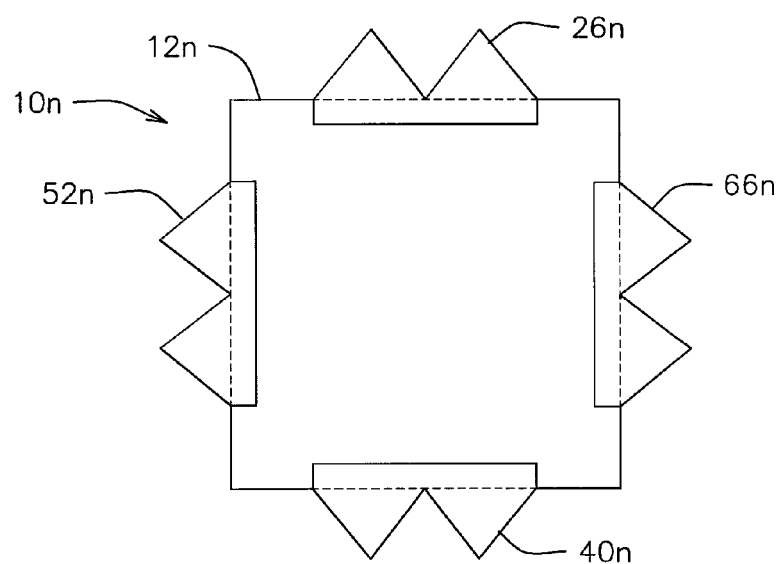
FIG. 27 is an elevational view of another embodiment of the wrapper of the presently disclosed and claimed inventive concept(s).

Referring now to FIG. 27, shown therein and designated by the reference numeral 10*n* is a wrapper which is essentially similar in construction and use to the other wrappers described elsewhere herein except as described below. Wrapper 10*n* comprises a sheet of material 12*n* and four extensions 26*n*, 40*n*, 52*n*, and 66*n*, each having a pair of points, which are attached to sheet of material 12*n* and which extend past edge thereof. Wrapper 10*n* is shown as having four such extensions but may alternatively be equipped with only one, two, or three, or alternately may have additional extensions which overlap one or more of extensions 26*n*, 40*n*, 52*n*, or 66*n*.

Figure 28:
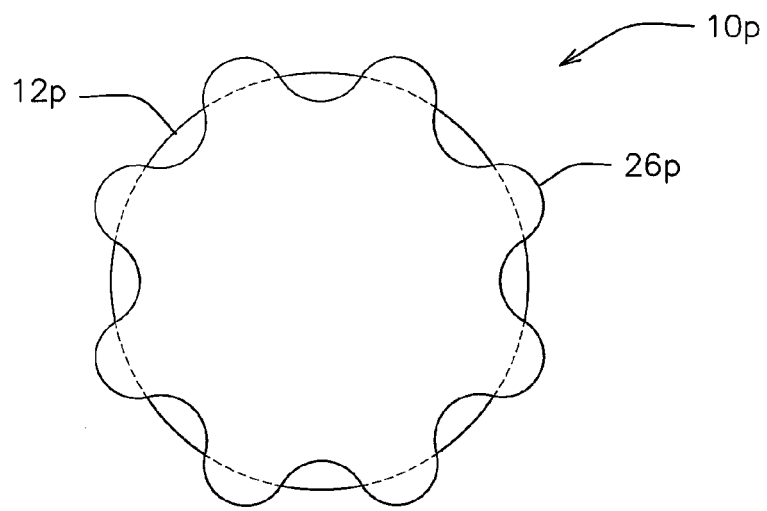
FIG. 28 is an elevational view of another embodiment of the wrapper of the presently disclosed and claimed inventive concept(s).
Figure 29:
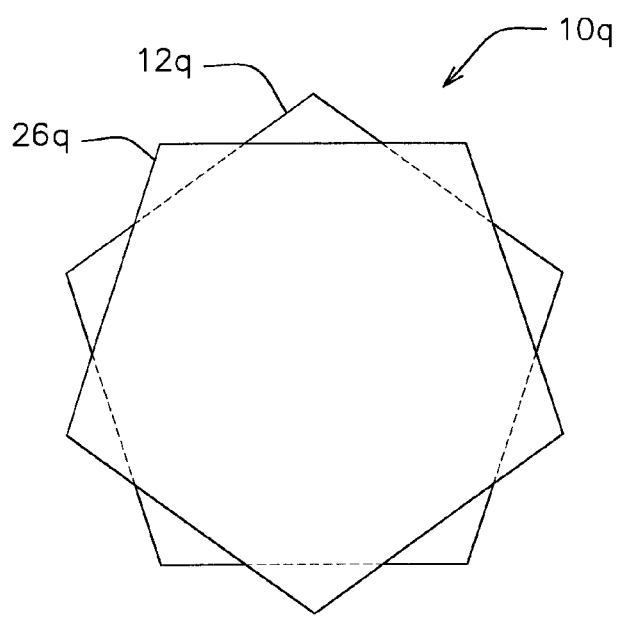
FIG. 29 is an elevational view of another embodiment of the wrapper of the presently disclosed and claimed inventive concept(s).

Referring now to FIG. 28, shown therein and designated by the reference numeral 10*p* is a wrapper which is essentially similar in construction and use to the other wrappers described elsewhere herein except as described below. Wrapper 10*p* comprises first a sheet of material 12*p* which forms a base sheet and a second sheet of material 26*p* which is attached to first sheet of material 12*p* and which has portions which extend beyond an edge or edges of the first sheet of material 12*p*. Second sheet of material 26*p* is shown as having a curved or wavy border but any other shape of sheet may be used, in combination, for example as shown in FIG. 29 wherein wrapper 10*q* is constructed of a first sheet of material 12*q* and a second sheet of material 26*q* attached thereto, both of which are pentagonally-shaped but which in alternate embodiments may be any other geometric, biomorphic, or irregularly-shaped sheet of material.

Figure 30:
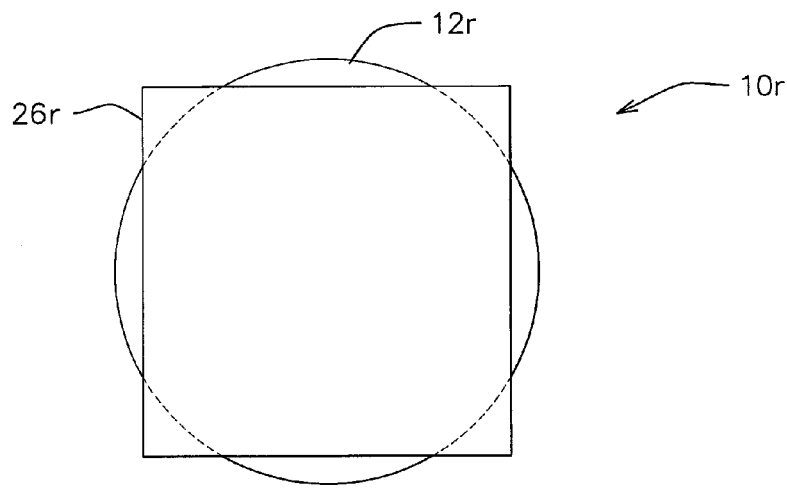
FIG. 30 is an elevational view of another embodiment of the wrapper of the presently disclosed and claimed inventive concept(s).

For example, in reference to FIG. 30, shown therein and designated by the reference numeral 10r is a wrapper which is essentially similar in construction and use to the other wrappers described elsewhere herein except as described below. Wrapper 10r comprises a first sheet of material 12r which is round and a second sheet of material 26r which is square or rectangular which is attached to sheet of material 12r.

Figure 31:
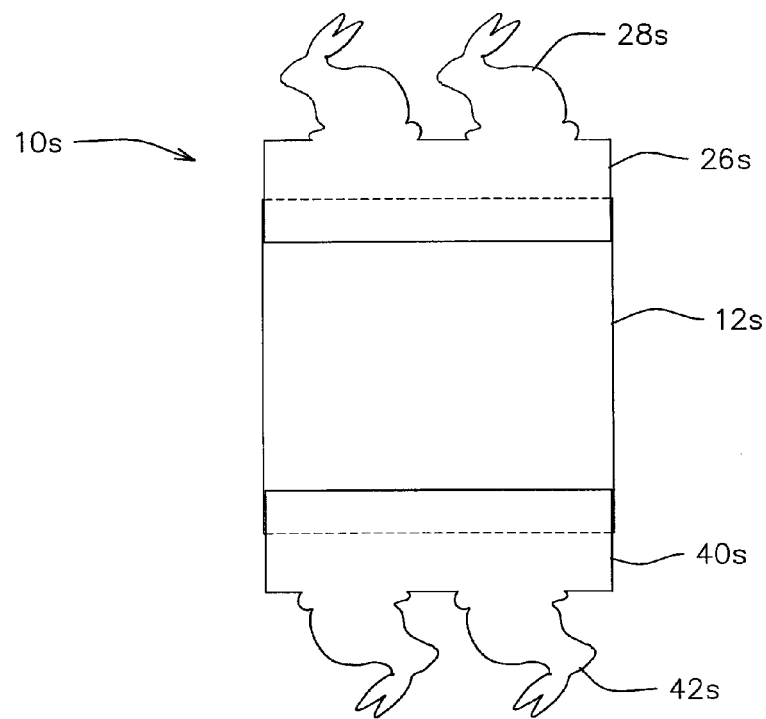
FIG. 31 is an elevational view of another embodiment of the wrapper of the presently disclosed and claimed inventive concept(s).
Figure 32:
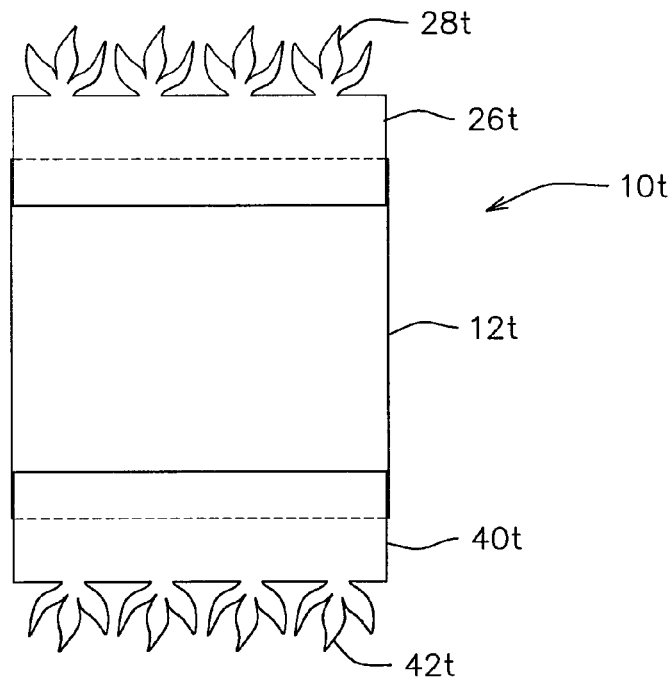
FIG. 32 is an elevational view of another embodiment of the wrapper of the presently disclosed and claimed inventive concept(s).

Referring now to FIG. 31, shown therein and designated by the reference numeral 10s is a wrapper which is essentially similar in construction and use to the other wrappers described elsewhere herein except as described below. Wrapper 10s comprises a sheet of material 12s, a first extension 26s and a second extension 40s. Wrapper 10s is similar to wrappers 10b or 10c except first extension 26s and second extension 40s have first edges 28s and 42s, respectively, which have a "bunny rabbit"-type biomorphic shape therein. Similarly, FIG. 32 shows a wrapper 10t which has a sheet of material 12t, and first extension 26t and second extension 40t attached thereto and which have first edges 28t and 42t, respectively, which have a "leaf"-type biomorphic shape therein. These represent but two examples of biomorphic shapes which the extensions of the wrappers described herein may comprise.

Figure 33:
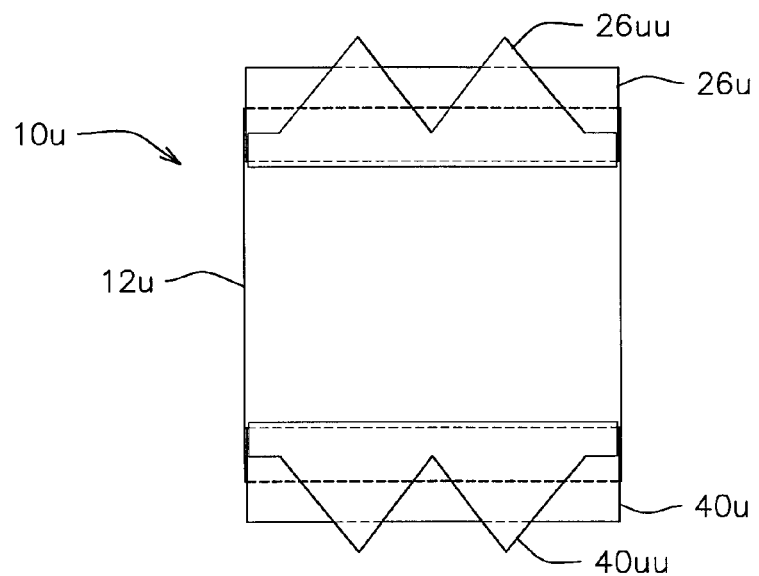
FIG. 33 is an elevational view of another embodiment of the wrapper of the presently disclosed and claimed inventive concept(s).

Referring now to FIG. 33, shown therein and designated by the reference numeral 10u is a wrapper which is essentially similar in construction and use to the other wrappers described elsewhere herein except as described below. Wrapper 10u comprises a sheet of material 12u, two co-extensions 26u and 26uu, both of which are attached to and extend from one end of sheet of material 12u and two additional co-extensions 40u and 40uu both of which are attached to and extend from the opposing end of the sheet of material 12u. Co-extension 26u overlaps co-extension 26uu, and co-extension 40u overlaps co-extension 40uu, and are attached to sheet of material 12u in a manner similar to that described for wrapper 10i of FIGS. 20-21.

Referring now to FIG. 34, shown therein is a wrapper 10b, previously described, which has been used as a basket wrapper to cover a basket 140. The wrapper 10b is preferably secured about the basket 140 via a securing element 118 as described previously.

Shown in FIG. 35 is a gift bag 150 constructed in a manner similar to the wrappers described elsewhere herein. Gift bag 150 comprises a base 152 constructed of a material such as is used to construct sheet of material 12 of wrapper 10. The gift bag 150 further comprises a decorative extension 154 attached to the base 152 and extending therefrom in a manner similar to the wrappers described elsewhere herein. Gift bag 150 further optionally comprises a handle 156. The gift bag 152 is therefore constructed in a manner similar to wrappers described herein and is used in a manner known to those of skill in the art to contain or present gifts and other items in a decorative manner.

Shown in FIG. 36 and designated therein by reference numeral 160 is a liner having a base 162 and extension 164 which is attached to and extends from the base 162. The liner 160 is constructed in a manner similar to the wrappers described elsewhere herein and is used as a liner for a basket 166 or other container such as a gift can, pot, box, or bag.

Figure 37:
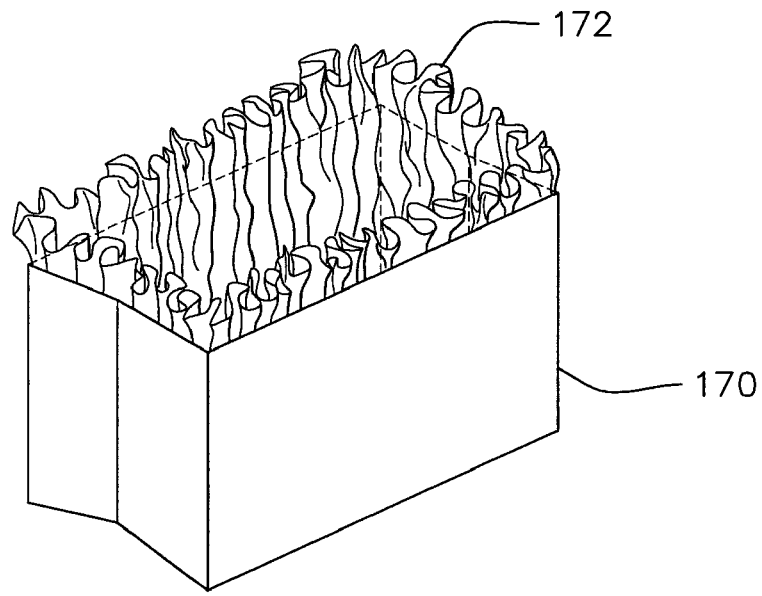
FIG. 37 is a perspective view of a box or bag wherein a material constructed in accordance with the presently disclosed and claimed inventive concept(s) is used as a filler for the box or bag.

Shown in FIG. 37 is a sack, bag, basket, box, or other container designated by reference numeral 170 which is used to contain items such as gift items, fruit, nuts, Easter eggs, or the like. A filler material 172 is disposed within the container 170 to decorate, cushion, or fill the container with the item therein. The filler 172 comprises entire wrappers (or portions or strips thereof) such as are described herein.

Figure 38:
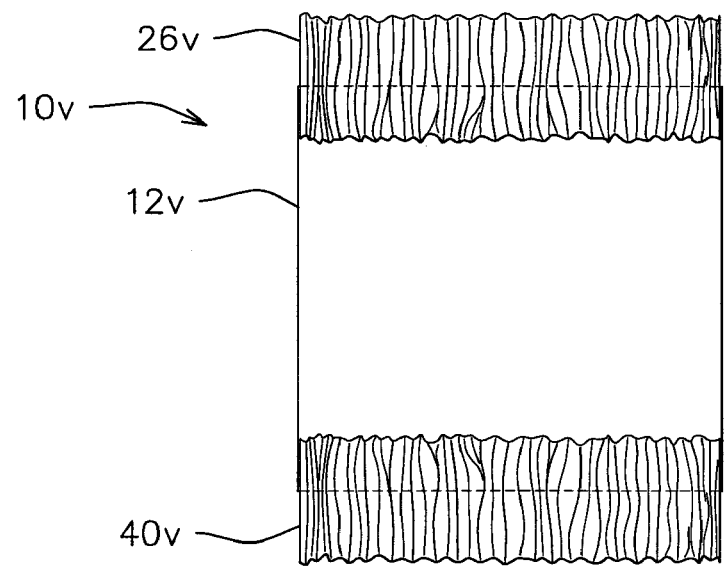
FIG. 38 is an elevational view of an alternate embodiment of the presently disclosed and claimed inventive concept(s) wherein the extensions have a ruffled configuration.

Furthermore, referring now to FIG. 38 shown therein and designated by the reference numeral 10v is a wrapper essentially similar in construction and use to the other wrappers described elsewhere herein except as described below. Wrapper 10v comprises a sheet of material 12v and extensions 26v and/or 10v attached at opposing ends of the sheet of material 12v. Wrapper 10v is similar to wrapper 10b of FIGS. 5-6 except the extensions 26v and/or 40v comprise a "ruffled" configuration when attached to the sheet of material 10v for providing an alternate style or decorative effect. Any of the wrappers described herein may comprise extensions having a similar ruffled condition.

Any of the wrappers shown or described herein can be constructed using multiple webs of material which are laminated or attached together to achieve contrasting effects in the completed wrapper, produced for example by using webs of materials having different patterns, colors, textures, or constructed of different materials. For example, one or more 5 inch by 20 inch sheets of film with a decorative design or effect thereon may be laminated lengthwise along a ½ inch seal to a 20"×20" sheet of opaque or metallized film to form a wrapper contemplated herein.

It may be preferable in some instances and with some equipment to laminate either by overall adhesively laminating or spot laminating or strip laminating the extension material. It is preferable to leave certain portions of the extension unlaminated or unattached so as to provide the appearance of separate sheets as described previously. None of the dimensions described herein are intended to limit the possible dimensions which comprise the wrappers described herein.

Any of the wrappers described herein may be secured about a pot, or potted plant, or floral grouping or other item contemplated herein via a securing element such as a rubber band, elastic band, non-elastic band, string, ribbon, wire or plastic tie, shrink films or materials (e.g., heat shrink or moisture-shrink film), collar, sleeve, tape, label, stribbon, stretch film, metal strip, overpot, jardinière overpot, Speed Cover™, or any other banding device known to those of ordinary skill in the art. The securing element may be positioned below or above an upper end of the item or pot. More than one securing element can be used. The securing element may be applied manually or automatically. The securing element preferably is a banding element but may also be an adhesive or cohesive material, barbs or slots on the pot, pins, clips, springs, staples, magnets, heat seals, chemical seals, vibratory seals or any other binding or securing materials known in the art. The securing element can be attached to the sheet of material and/or extension, or can be initially separate from the sheet of material or extension.

The wrappers described herein can be constructed, in whole or in part, from materials including, but not limited to, polymer films, metallized polymer films, natural films, metallized natural films, printed materials of any type, matted materials of any type, cloth, fabric, spun bonded or melt blown materials, cling or "cling-type" materials, paper, tissue, cellophane, biodegradable materials, recyclable materials, and deadfold materials including metal foils and polyfoil. Preferably, the extension is constructed of a material with a lace or lace-like appearance which is different from the material used to construct the sheet of material to which the extension is attached. For example, the sheet of material may be constructed of metallized film, polymer film, foil, deadfold materials, spun bonded or melt blown material, fabric, or cellophane, any of which may have different colors, patterns, or textures, while the extension is constructed of a lace-pattern material or of a metallized film, polymer film, foil, deadfold materials spun bonded or melt blown material, fabric, or cellophane having a lace pattern (which may be, for example, cut into or printed on the material), any of which may have different colors, lace patterns, and/or textures. In one embodiment, the wrapper may be constructed of a polymer film which has been printed to have the appearance of a spun-bonded or melt-blown material. In another embodiment, a spun-bonded or melt-blown material can be attached or laminated to a polymer film to provide a waterproof quality to the spun-bonded or melt-blown material. Other materials and methods of providing a material with a decorative appearance will readily come to the mind of the person of ordinary skill in the art. The separate materials used to construct the wrapper may be laminated together while the webs of material are in a flattened condition. When the wrapper is constructed of only one or more single extensions and does not comprise overlapping extensions as defined herein, the extension does not comprise a "cling-type" self-adhering film. When the wrapper is constructed in whole or in part by a "cling-type" material, or by a deadfold material such as a metal foil, a securing element is not necessarily required to secure the wrapper about the item wrapped since the wrapper retains its shape after being folded.

The materials from which the wrappers shown or described herein are constructed preferably have a thickness in a range from about 0.1 mil to about 30 mil. Often, the thicknesses of the wrappers are in a range from about 0.5 mil to about 10 mil or preferably, in a range from about 1.0 mil to about 5 mil. Preferably, the wrappers are constructed from a material which is flexible, semi-rigid, rigid, or any combination thereof. The wrappers may be constructed of a single layer of material or a plurality of layers of the same or different types of materials. Any thickness of the material may be utilized as long as the material functions in accordance with the presently disclosed and claimed inventive concept(s) as described herein. Any thickness of material may be utilized in accordance with the presently disclosed and claimed inventive concept(s) as long as the wrapper may be formed as described herein, and as long as the wrapper may contain at least a portion of a flower pot, potted plant, growing medium or floral grouping, as described herein. Additionally, an insulating material such as bubble film, preferable as one of two or more layers, can be utilized in order to provide additional protection for the item, such as the floral grouping, contained therein.

As noted above, the wrappers shown or described herein may be constructed from any suitable material that is capable of being formed into a wrapper as contemplated herein and wrapped about a flower pot and/or a floral grouping or item disposed therein. Preferably, the materials include treated or untreated paper, metal foil including deadfold materials, polymeric film, non-polymeric film woven, or nonwoven fabric, or synthetic or natural fabric, cardboard, fiber, cloth, burlap, or laminations or combinations thereof. As previously noted, the material comprising the extension is preferably not a "cling"-type self-adhering film. Preferably, the material used to construct the sheet of material and/or extensions of the wrapper is a waterproof material such as BOPP (biaxially oriented polypropylene) or metallized BOPP, is substantially waterproof or water resistant.

The term "polymeric film" when used herein means a film made of a synthetic polymer such as a polypropylene or a naturally occurring polymer such as cellophane. A polymeric film is relatively strong and not as subject to tearing (substantially non-tearable), as might be the case with paper or foil.

The materials comprising the wrappers shown or described herein may vary in color and as described herein consists of designs or decorative patterns which are printed, etched, and/or embossed thereon using inks or other printing materials. An example of an ink which may be applied to the surface of the material is described in U.S. Pat. No. 5,147,706, which is hereby expressly incorporated herein by reference.

In addition, the materials may have various colorings, coatings, flocking and/or metallic finishes, or other decorative surface ornamentation applied separately or simultaneously or may be characterized totally or partially by pearlescent, translucent, transparent, iridescent, neon, or the like, qualities. The material may further comprise, or have applied thereto, one or more scents. Each of the above-named characteristics may occur alone or in combination in the material. Moreover, portions of the materials used in constructing the wrappers shown or described herein may vary in the combination of such characteristics. The materials utilized in the wrappers may be opaque, translucent, transparent, or partially clear or tinted transparent. The wrapper may have a low-slip (non-slip) material thereon which imparts a "frictional" quality to the wrapper. The non-slip coating may have a high coefficient of friction and may be disposed on either surface of the wrapper. The coating may be a lacquer. The low- or non-slip material preferably reduces the tendency of the wrapper to slip or slide off the pot or the securing element to slide or slip downwardly.

The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. The floral grouping preferably comprises a bloom or foliage portion and a stem portion and may comprise roots. Further, the floral grouping may be the plant portion of a potted plant. However, it will be appreciated that the floral grouping may consist of only a single bloom or only foliage, or a botanical item (not shown), or a propagule (not shown). The term "floral grouping" may be used interchangeably herein with both the terms "floral arrangement" and "potted plant". The term "floral grouping" may also be used interchangeably herein with the terms "botanical item" and/or "propagule".

The term "growing medium" or "retaining medium" when used herein means any liquid, solid or gaseous material used for plant growth or for the cultivation of propagules, including organic and inorganic materials such as soil, humus, perlite, vermiculite, sand, water, foam, and including the nutrients, fertilizers or hormones or combinations thereof required by the plants or propagules for growth or any material effective in supporting a plant, cutting, or floral grouping.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet of floral grouping. The term "propagule" when used herein means any structure capable of being propagated or acting as an agent of reproduction including seeds, shoots, stems, runners, tubers, plants, leaves, roots, or spores.

In accordance with the presently disclosed and claimed inventive concept(s) and as noted earlier, a bonding material may optionally be disposed on a portion of any of the wrappers shown or described herein to attach each wrapper to a flower pot or to assist in closing or sealing an upper portion of the wrapper, respectively, or in adhering the wrapper to the pot.

The term "detaching element" where used herein means any element or device such as, but not limited to, perforations, tear strips, zippers, and any other devices or elements of this nature known in the art, or any combination thereof, which enable the tearing away or detachment of one object from another.

It will be understood by a person of ordinary skill in the art that equipment and devices for laminating or securing webs of material together are commercially available, and are well-known to a person of ordinary skill in the art. Therefore, detailed discussion of the construction of the wrappers shown or described herein is not deemed necessary. Briefly however, the wrappers shown or described herein may be formed by advancing two or more webs in parallel and sealing portions of them together longitudinally. The webs may be formed into a roll as described elsewhere herein and perforations may be inserted into the webbing for easy separation of individual wrappers by the user.

The term "flower pot" or "pot" as used herein refers to any type of container used for holding a floral grouping or plant, including vases. Examples of pots, used in accordance with the presently disclosed and claimed inventive concept(s) include, but are not limited to, clay pots, foam pots, wooden pots, plastic pots, pots made from natural and/or synthetic fibers (such as peat moss), and/or any combination thereof. The flower pot is adapted to receive a floral grouping in the retaining space thereof. The floral grouping may be disposed within the flower pot along with a suitable growing medium described elsewhere herein, or other retaining medium, such as floral foam.

Preferably the wrappers shown or described herein are sized to contain and conform to at least one of a variety of standard sizes of pots known to those of ordinary skill in the art, such as 3½ inch, 4 inch, 4½ inch, 5 inch, 5½ inch, 6 inch, 6½ inch, 7 inch, 7½ inch, 8 inch and 8½ inch pots or pots that are larger than, smaller than, or intermediate between such pot sizes such that preferably when the wrapper is applied about the pot a skirt portion is formed as described earlier which is positioned near the upper rim of the pot.

In an alternative embodiment of the presently disclosed and claimed inventive concept(s), the decorative wrapper may comprise a single sheet of material wherein two opposing end portions of the sheet of material are decorated, printed and/or colored differently from a middle portion of the sheet of material between the two opposing end portions, thereby providing a "two-sheet" effect when the decorative wrapper is formed about the pot.

Changes may be made in the construction and the operation of the various components, elements, and assemblies described herein or in the steps or the sequence of steps of the methods described herein without departing from the spirit and scope of the presently disclosed and claimed inventive concept(s) as defined in the following claims.

What is claimed is:

1. A method of wrapping a flower pot, the method comprising the steps of:
   providing a flower pot having an upper end, a lower end and an outer peripheral surface;
   providing a decorative wrapper comprising:
      a sheet of material having a first edge, a second edge opposite the first edge, a first side, a second side opposite the first side, a first surface and a second surface; and
      a first extension constructed of a second sheet of material and having a first edge, a second edge opposite the first edge, a first side, and a second side opposite the first side, and the first extension having a decorative pattern or decorative effect, and wherein the first extension comprises a facing portion which is superposed upon the first surface of the sheet of material;
      a second extension which at least partially overlaps the first extension and is sealed to at least one of the sheet of material and the first extension and wherein the second extension has a first edge which forms an additional upper peripheral edge in a skirt of the decorative wrapper; and,
      wherein the first extension is attached via a seal to the first surface of the sheet of material along only a portion of the facing portion of the first extension whereby a majority of the facing portion of the first extension is left unattached to the first surface of the sheet of material and wherein the first edge of the first extension is completely unattached to the sheet of material and the first edge of the sheet of material is unattached to the first extension, and wherein the first edge of the first extension extends beyond the first edge of the sheet of material; and
   wrapping the decorative wrapper about the outer peripheral surface of the flower pot such that the lower end of the flower pot is covered by the sheet of material, and the lower end of the flower pot is substantially uncovered by the first and second extensions, thereby forming a decorative cover for the flower pot wherein the first and second extensions extend separately from the sheet of material such that the decorative cover comprises a skirt having a first upper peripheral edge formed of the first edge of the sheet of material, a second upper peripheral edge formed of the second edge of the sheet of material, a third upper peripheral edge formed of the first edge of the first extension and a fourth upper peripheral edge formed of the first edge of the second extension, thereby providing the decorative cover with an appearance of being constructed of three unconnected sheets of material that are wrapped about the lower end of the flower pot.

2. The method of claim 1 wherein, in the step of providing the decorative wrapper, the sheet of material has a width comprising the maximum distance between the first edge and the second edge and the first extension has a width comprising the maximum distance between the first edge and the second edge of the first extension, and wherein the width of the first extension is less than the width of the sheet of material.

3. The method of claim 1 wherein, in the step of providing the decorative wrapper, the second extension has a width which is substantially less than the width of the sheet of material.

4. The method of claim 1 wherein, in the step of wrapping the decorative wrapper about the outer peripheral surface of the flower pot, the first and second edges of the sheet of material, the first edge of the first extension and the first edge of the second extension are disposed in a position substantially above the upper end of the flower pot.

5. The method of claim 1 wherein, in the step of providing a decorative wrapper, at least one of the first edge of the first extension and the first edge of the second extension has at least one of a non-linear, irregular, geometric, and biomorphic shape.

6. The method of claim 1 wherein, in the step of providing a decorative wrapper, the first and second edges of the sheet of material are straight.

7. The method of claim 1 wherein, in the step of providing a decorative wrapper, at least one of the first and second edges of the sheet of material has at least one of a non-linear, irregular, geometric, and biomorphic shape.

8. The method of claim 1 wherein, in the step of providing a decorative wrapper, the width of the first extension and the width of the second extension each are between 2% and 35% of the width of the sheet of material.

9. The method of claim 1 wherein, in the step of providing a decorative wrapper, the seal connecting the first extension and the seal connecting the second extension to the sheet of material each comprises one or more discrete areas of connection.

10. The method of claim 1 wherein, in the step of providing a decorative wrapper, the seal connecting the first extension and the seal connecting the second extension to the sheet of material each comprises a strip extending substantially entirely between the first side and second side of the sheet of material.

11. The method of claim 1 wherein, in the step of providing a decorative wrapper, the decorative wrapper is further defined as comprising an adhesive bonding material or non-slip material disposed upon a portion thereof.

12. The method of claim 1 wherein, in the step of providing a decorative wrapper, the sheet of material is constructed of an opaque material and wherein at least one of the extensions is constructed of a transparent material having at least one of a decorative pattern, decorative effect and a coloration.

* * * * *